United States Patent [19]
Rak

[11] Patent Number: 5,833,103
[45] Date of Patent: Nov. 10, 1998

[54] VEHICLE ARTICLE CARRIER HAVING SINGLE SIDE RELEASABLE LOCKING MECHANISM

[75] Inventor: Artur K. Rak, Rochester Hills, Mich.

[73] Assignee: JAC Products, Inc., Ann Arbor, Mich.

[21] Appl. No.: 968,157

[22] Filed: Nov. 12, 1997

[51] Int. Cl.[6] ........................ B60R 9/00
[52] U.S. Cl. .................... 224/321; 224/315
[58] Field of Search ................ 224/321, 309, 224/315, 322, 323, 325, 326, 317

[56] References Cited

U.S. PATENT DOCUMENTS

| | | |
|---|---|---|
| 4,500,020 | 2/1985 | Rasor . |
| 4,684,048 | 8/1987 | Bott . |
| 5,203,483 | 4/1993 | Cucheran . |
| 5,470,003 | 11/1995 | Cucheran ................ 224/321 |
| 5,579,970 | 12/1996 | Cucheran et al. .......... 224/321 |

*Primary Examiner*—David J. Walczak
*Attorney, Agent, or Firm*—Harness, Dickey & Pierce, PLC

[57] ABSTRACT

A vehicle article carrier having a rotatable cross bar which simultaneously causes bracket members at each end of the cross bar to be locked and unlocked in accordance with rotational movement of the cross bar. A cross bar supporting member is disposed at each end of the cross bar and includes a camming portion. The camming portion of each supporting member simultaneously causes a clamping member to be moved between locked and unlocked positions when a user engages an actuating member associated with one of the bracket members and concurrently rotates the cross bar. Thus, there is no need for cables or other members to extend through the cross bar to accomplish the simultaneous locking and unlocking of both of the bracket members.

29 Claims, 3 Drawing Sheets

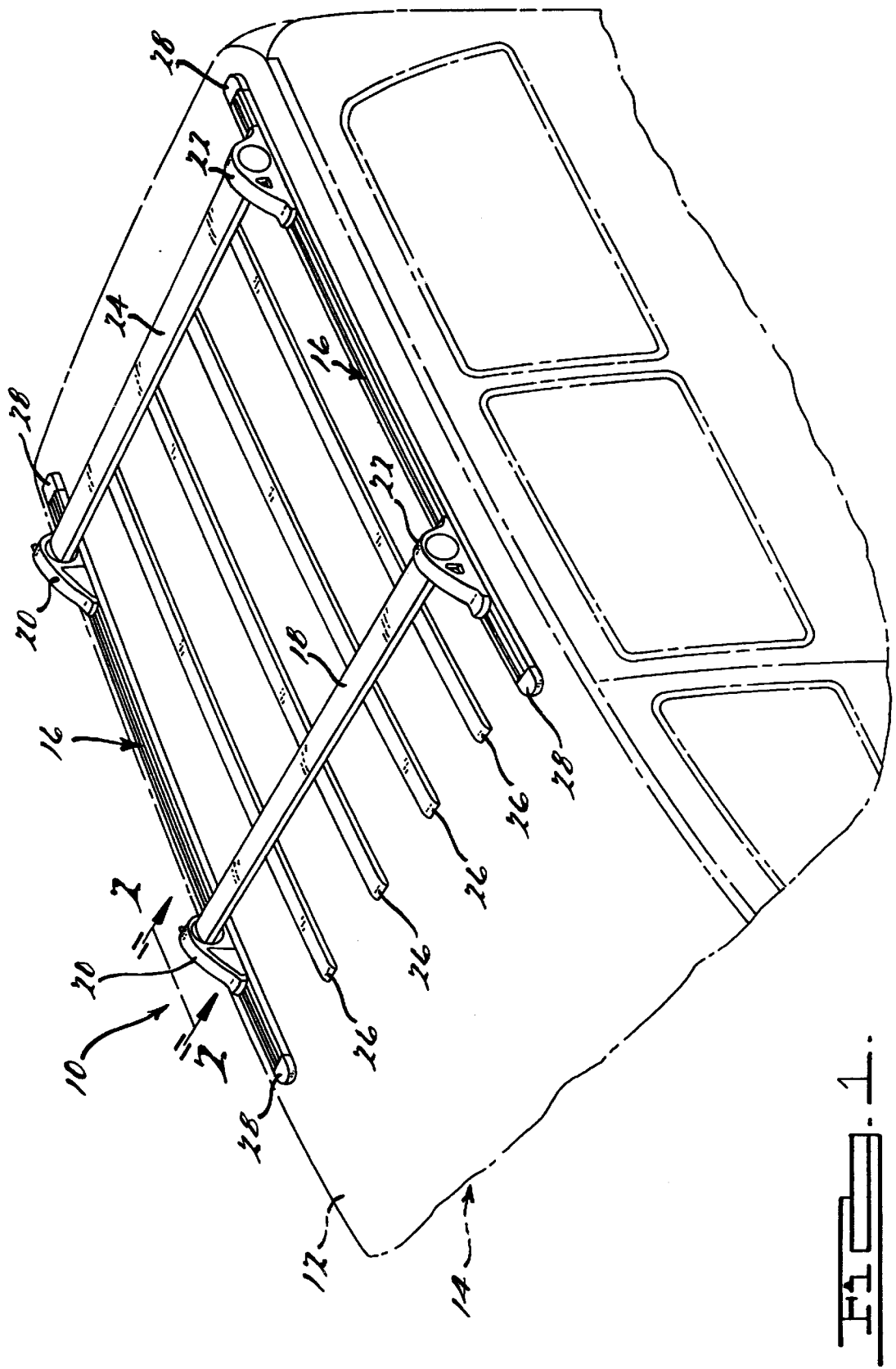

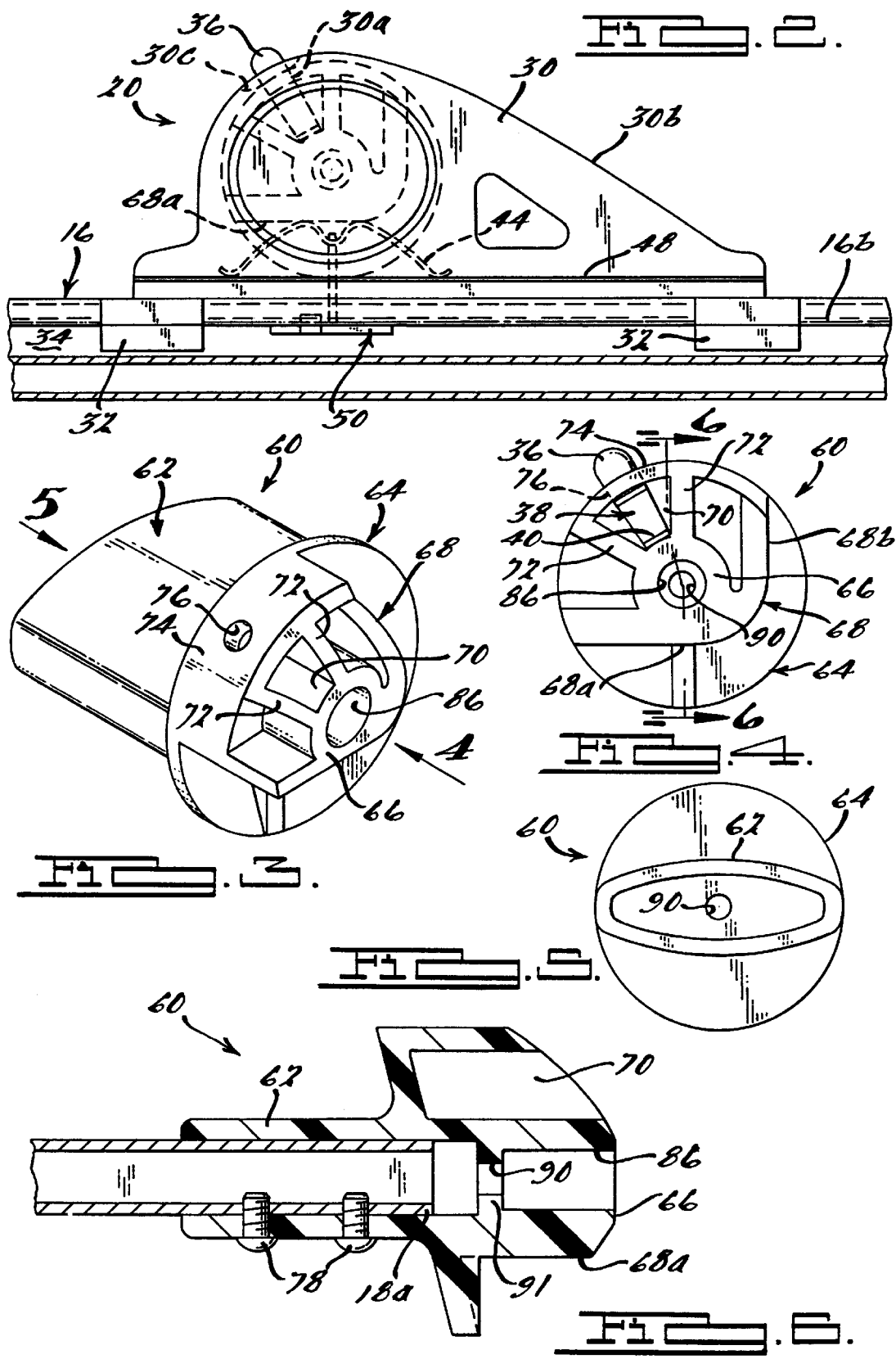

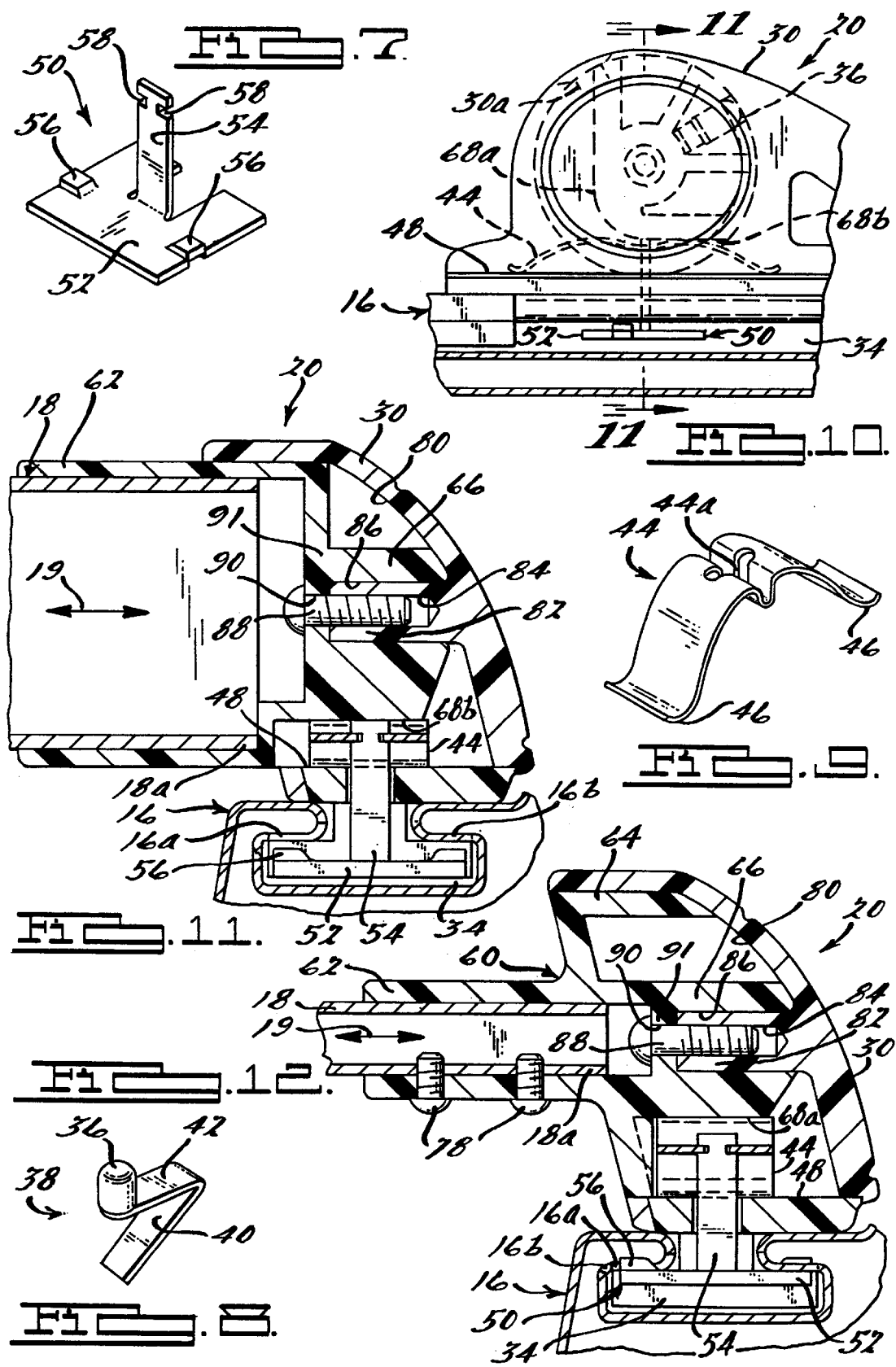

VEHICLE ARTICLE CARRIER HAVING SINGLE SIDE RELEASABLE LOCKING MECHANISM

BACKGROUND OF THE INVENTION

1. Technical Field

This invention relates to vehicle article carriers, and more particularly to a vehicle article carrier incorporating a cross bar which may be manually rotated by a user to simultaneously place a pair of bracket members of the article carrier in locked and unlocked positions.

2. Discussion

Vehicle article carriers are used in a wide variety of applications to transport various articles thereon above an outer body surface of the vehicle. Typically, such article carriers incorporate a pair of slats which are fixedly mounted to the outer body surface of the vehicle, a pair of bracket members slidably disposed on the slats and a cross bar disposed between the bracket members so as to be supported above the outer body surface by the bracket members. Each bracket member typically includes some form of locking mechanism with an actuating member for placing the locking mechanism in a locked or an unlocked position. When the locking mechanism of each bracket member is in its unlocked position, the bracket members may be moved slidably along the slats to reposition the cross bar at a desired position along the slats.

The obvious drawback to this arrangement is that when the user desires to reposition the cross bar, first one of the bracket members must be unlocked and then the user must walk around to the opposite side of the vehicle to unlock the other bracket member. Once the cross bar has been moved to its desired position, the user must manually place both of the bracket members in their locked positions. Thus, the user is presented with the inconvenience of separately locking and unlocking two bracket members whenever the cross bar is to be repositioned.

Some manufacturers of vehicle article carriers have attempted to address this problem by providing means for simultaneously locking and unlocking each bracket member via a single actuating mechanism. One such article carrier is disclosed in U.S. Pat. No. 5,190,198 to Cucheran, assigned to the assignee of the present application. While this device has proven to be successful and satisfactory for its intended purpose, the number of component parts associated with the apparatus disclosed in this patent make the apparatus somewhat complicated and costly to manufacture and assemble. Other forms of vehicle article carriers which have attempted to incorporate some form of "single-sided" release mechanism for simultaneously locking and unlocking a pair of bracket members to their respective slats have also proven to be complicated and costly to construct.

Accordingly, it would be highly desirable to provide a vehicle article carrier which incorporates a means for simultaneously locking and unlocking both bracket members from their respective slats. In this manner, a user would be able to lock and unlock both bracket members from one side of the vehicle whenever the cross bar of the article carrier is to be repositioned. This would add significant convenience to the procedure of repositioning the cross bar.

It would also be highly desirable to provide a vehicle article carrier having a mechanism which enables both bracket members to be simultaneously locked and unlocked, wherein the mechanism has a minimum number of moving parts, and through a design which is relatively simple and cost effective to manufacture and assemble.

SUMMARY OF THE INVENTION

The above and other objects are provided by a vehicle article carrier apparatus having a single-sided release mechanism in accordance with preferred embodiments of the present invention. The apparatus generally includes a pair of bracket members which are slidably disposed on a pair of slats, with the slats being fixedly secured to an outer body surface of the vehicle. A cross bar supporting member is secured at each opposite end of the cross bar and includes a camming surface. Each cross bar supporting member is rotationally coupled to a respective one of the bracket members. Each bracket member also includes a locking member for locking the bracket member to the slat upon which the bracket member is mounted.

Each of the locking members are moved from a locked to an unlocked position by manually grasping the cross bar and rotating same about a longitudinal axis extending through the cross bar. An actuating member associated with at least one of the bracket members prevents the cross bar supporting member from moving rotatably relative to the bracket member unless the actuating member is manually engaged by an operator before attempting to rotate the cross bar. In this manner, both of the bracket members may be moved between locked and unlocked positions simultaneously relative to their respective slats by simply grasping the cross bar and rotating same in one rotational direction or the other. Accordingly, the apparatus of the present invention significantly eases the manner with which the cross bar may be adjustably positioned along the slats by eliminating the need to first unlock one of the bracket members and then walk to the opposite side of the vehicle and unlock the other bracket member.

The apparatus of the present invention further incorporates a very small number of component parts. As such, the apparatus of the present invention can be manufactured simply and relatively inexpensively. The relatively few number of component parts enable the apparatus to be quickly and easily assembled.

In the preferred embodiments each bracket member further includes a biasing member for urging its locking member between unlocked and locked positions. The locking member, in one preferred embodiment, is formed by a clamping member having a portion which resides within a channel of a respective one of the slats and clamps the bracket member to its respective slat when the cross bar is in the locked position. The apparatus of the present invention thus does not require the use of cables or other like components which, in some previously developed designs, must be routed through the cross bar, thereby complicating assembly of the vehicle article carrier and adding to its overall cost.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a vehicle incorporating the vehicle article carrier of the present invention;

FIG. 2 is a side view of one of the bracket members of the vehicle article carrier, generally in accordance with directional arrow 2 in FIG. 1, illustrating in phantom the biasing member and the cross bar supporting member, as well as illustrating in elevation a portion of the clamping member and a portion of the slat upon which the bracket member is mounted;

FIG. 3 is a perspective view of the cross bar supporting member;

FIG. 4 is an end view of the cross bar supporting member of FIG. 3 shown in accordance with directional arrow 4 in FIG. 3;

FIG. 5 is an end view of the cross bar supporting member of FIG. 3 shown in accordance with directional arrow 5 in FIG. 3;

FIG. 6 is a cross sectional side view of the cross bar supporting member taken in accordance with section line 6—6 in FIG. 4;

FIG. 7 is a perspective view of the clamping member of the present invention;

FIG. 8 is a perspective view of the actuating member of the present invention;

FIG. 9 is a perspective view of the biasing member of the present invention;

FIG. 10 is a side view of a portion of the bracket member of FIG. 2 showing the clamping member in the unlocked position relative to the slat;

FIG. 11 is a cross sectional end view of the bracket member taken generally in accordance with section line 11—11 in FIG. 10, and a portion of the cross bar, showing the bracket member in the unlocked position; and FIG. 12 is a view of the bracket member of FIG. 11 showing the clamping member in the locked position.

DETAILED DESCRIPTION OF THE PREFERRED EMBODIMENTS

Referring to FIG. 1, there is shown a vehicle article carrier 10 mounted on an outer body surface 12 of a vehicle 14. The vehicle article carrier 10 includes a pair of elongated slats 16 and a front cross bar 18 supported above the outer body surface 12 by a pair of bracket members 20 and 22. A second or rear cross bar 24 is also included and shown supported above the outer body surface 12 by bracket members 20 and 22. While all of the bracket members 20 and 22 are disposed for sliding movement on the slats 16, it will be appreciated that one of the cross bars 18 or 24 could just as easily be fixedly mounted to the slats 16 so as not to be movable. In practice, it is anticipated that incorporating one fixed cross bar will be the preferred arrangement.

With further reference to FIG. 1, a plurality of optional, intermediate slats 26 may also be included to prevent articles or portions thereof from contacting the outer body surface 12 of the vehicle 14. End caps 28 at each outermost end of the slat 16 prevent the bracket members 20 and 22 from being accidentally removed from the slat 16.

Referring to FIG. 2, one of the bracket members 20 is illustrated. The bracket member 20 includes a housing 30 having a pair of conventional T-lugs 32 integrally formed therewith which are adapted to slide within a channel 34 of the slat 16. Each bracket member 20 further includes an actuating button 36 protruding through an opening 30a in the housing. A recess 30c in an outer surface 30b of the housing 30 is formed so as to circumscribe the opening 30a. The actuating button 36 allows the bracket member 20 to be placed in an unlocked position by depressing actuating button 36 and holding same depressed while the cross bar 18 is rotated. This function will be described in greater detail momentarily.

With brief reference to FIG. 8, an actuating member 38 incorporating the actuating button 36 is illustrated. The actuating member 38 is formed preferably from a length of spring steel and has a base portion 40 and a neck portion 42. The actuating button 36 may be formed from metal or plastic and secured to the neck portion 42 in any conventional manner such as by welding, a threaded fastener, etc. The neck portion 42 is flexible relative to the base portion 40 when a force is exerted on the actuating button 36.

With further reference to FIGS. 2 and 9, the bracket member 20 also incorporates a biasing member 44. The biasing member is formed from a single length of curved spring steel in the shape of an inverted "W". End portions 46 rest on an interior surface wall 48 of the bracket member 20 as shown in FIG. 2. A notch 44a permits the biasing member 44 to be secured to a locking member of the bracket member 20, as will be explained momentarily.

With further reference to FIG. 2, the biasing member 44 is coupled to a locking member in the form of a clamping member 50. The clamping member 50 is shown in greater detail in FIG. 7. The clamping member 50 includes a base portion 52 and a neck portion 54 integrally formed from a single piece of material such as metal. It will be appreciated, however, that the clamping member 50 could be formed from two or more independent component pieces of material if desired. The base portion 52 includes a pair of raised portions 56 which are adapted to engage within notches or recesses formed in portions of the channel 34 of the slat 16, as will be described in greater detail momentarily. The neck portion 54 includes notches 58 which engage with the biasing member 44. Coupling of the clamping member 50 to the biasing member 44 is accomplished by inserting the neck portion 54 through the notch 44a and then turning the clamping member about 90° so that the notches 58 engage with a central portion 44b of the biasing member 44. The neck portion 54 is preferably of a length which causes a slight preloading or pretensioning of the biasing member 44 when the bracket member 20 is in the locked position shown in FIG. 2.

Referring now to FIGS. 2–6, the bracket member 20 also includes a cross bar supporting member or portion 60. Cross bar supporting member 60 includes a neck portion 62 into which an outer end portion 18a of cross bar 18 is inserted during assembly, and a main body portion 64. The main body portion 64 includes a hub 66 having a non-linear camming surface 68. A small cavity 70 is formed by a plurality of reinforcing ribs 72 and a wall portion 74. The wall portion 74 has an opening 76 in communication with the cavity 70. With brief reference to FIG. 4, the actuating member 38 is disposed within the cavity 70 such that the actuating button 36 projects outwardly through the opening 76. When the bracket member 20 is in the locked position, opening 76 aligns with opening 30a in the housing 30 to permit the actuating button 36 to project outwardly of the outer surface 30b of the housing 30 and to hold the cross bar supporting member 60 stationary relative to the housing 30.

In FIG. 4, the camming surface 68 can be seen to include a first portion 68a and a second portion 68b. Portion 68a is spaced a smaller distance from the axial center of the hub 66 then is the second portion 68b. Accordingly, as the cross bar supporting member 60 is rotated, the second portion 68b of camming surface 68 is able to apply a force against the biasing member 44 causing the clamping member 50 to be moved downwardly in the drawing of FIG. 2. This operation will also be described in greater detail momentarily.

Referring to FIGS. 5 and 6, the neck portion 62 of the cross bar supporting member 60 is shown in greater detail. The neck portion 62 forms a sleeve into which the outer end portion 18a of the cross bar 18 is inserted and secured with one or more threaded fasteners 78. Once the cross bar supporting member 60 is fixedly secured to the cross bar 18, rotational movement of the cross bar 18 causes a corresponding rotational movement of member 60.

Referring now to FIG. 11, the housing 30 of the bracket member 20 includes an interior cavity 80 having an integrally formed boss portion 82. The boss portion includes a bore 84. Assembly of the cross bar supporting member 60 to the housing 30 is accomplished by inserting the hub 66 over the boss portion 82 such that the boss portion engages within a bore 86 formed in the hub 66. The cross bar supporting member 60 is then secured to the bracket member 20 via a fastener such as a threaded screw 88 extending through an opening 90 in a wall portion 91 of the hub 66 which is concentric with the bore 86. Obviously, during assembly the cross bar supporting member 60 will need to be assembled to the housing 30 prior to securing the outer end 18*a* of the cross bar to member 60. Once the member 60 is secured to the housing 30, member 60 is able to rotate freely relative to the bracket member 20 within the cavity 80 of the bracket member 20.

With further reference to FIG. 11, the slat 16 can be seen to include notches 16*a* formed in ledge portions 16*b* thereof. The raised portions 56 of the clamping member 50 are able to engage within the notches 16*a*, which are spaced along the slat 16, to enable the bracket member 20 to be positively secured to the slat 16 when in the locked position.

With reference to FIGS. 2 and 12, the bracket member 20 is shown in the locked position. In this position the first portion 68*a* of the camming surface 68 is in contact with the biasing member 44 but exerting only a very minimal amount of force against the biasing member 44. The raised portions 56 of the clamping member 50 are engaged with notches 16*a* of the slat 16.

Referring now to FIGS. 10 and 11, the bracket member 20 is placed in the unlocked position by first manually pressing the actuating button 36 and holding same pressed while rotating the cross bar 18 about a longitudinal axis 19 extending through the cross bar 18. This rotation would correspond to a clockwise rotation in the drawing of FIG. 10. This causes the second portion 68*b* of camming surface 68 to engage the biasing member 44 and exert a downward force tending to flatten out the biasing member 44. As the biasing member 44 flattens out, the clamping member 50 moves downwardly into the position shown in FIGS. 10 and 11. At this point the cross bar 18 has been rotated approximately 90° from the position shown in FIG. 12. The recess 30*c* surrounding the opening 30*a* in the housing 30 (FIG. 9) and the rounded shape of the actuating button 36 permits one to release the button 36 after the cross bar 18 has been rotated a small degree, and the rounded surface of the actuating button 36 allows the button 36 to be urged inwardly as one continues to rotate the cross bar 18 into the position shown in FIG. 11. In this position the biasing member 44 has been flattened to a maximum degree, thus moving the raised portions 56 of the clamping member 50 completely out of the notches 16*a* of the slat 16. The bracket member 20 can thus be moved freely along the slat 16 and repositioned as needed. Portion 68*b* of the camming surface 68 permits the cross bar 18 to be released at this point and holds the biasing member 44 in the flattened position shown in FIGS. 10 and 11.

It is a principal object of the present invention that the above-described locking and unlocking arrangement occurs simultaneously with each pair of bracket members 20 and 22 as the cross bar 18 is rotated. Thus, it will be appreciated that while the construction of bracket member 20 has been described in detail, that the construction of bracket member 22 is identical to that of bracket member 20, with the only exception being that bracket member 22 does not require the actuating member 38 of FIG. 8 to accomplish the simultaneous locking and unlocking action. Thus, the housing of bracket member 22 does not require opening 30*a* (FIG. 2), the opening 76 formed in its cross bar supporting member or the cavity 70 (FIG. 3). Of course, the actuating member 38 could be included in bracket member 22 if desired, which would allow a user to simultaneously lock and unlock both bracket members 20 and 22 from either side of the vehicle 14.

With further reference to FIGS. 10 and 11, once the cross bar 18 has been rotated into its unlocked position as illustrated therein, the cross bar 18, and thus the clamping member 50 will be held in this position until the cross bar is rotated in the opposite rotational direction into the position shown in FIG. 12. Thus, the operator or individual adjusting the cross bar 18 does not need to hold the cross bar in its unlocked position while attempting to reposition both of the bracket members 20 and 22.

The cross bar supporting member 60 and the bracket member housing 30 are preferably formed from high strength plastics by conventional molding techniques such as injection molding. Each of the bracket members 20 and 22 thus form relatively simply constructed assemblies which are lightweight, constructed of a relatively small number of component parts and easy to assemble. Since rotational movement of the cross bar, and thus the cross bar supporting member 60 at each end of the cross bar 18, controls the clamping member associated with each bracket member 20 and 22, there is no need for cables or other like members to extend through the cross bar 18 and complicate the assembly process.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles above an outer body surface of a vehicle, said apparatus comprising:

a pair of slats adapted to be secured to said outer body surface;

a cross bar for supporting articles above said outer body surface;

a pair of bracket member disposed at opposite ends of said cross bar for supporting said cross bar above said outer body surface and for adjustably positioning said cross bar along said slats;

each of said bracket members including a locking member adapted to engage with a portion of an associated one of said slats; and each of said locking members of said bracket members being movable simultaneously into unlocked positions by rotating said cross bar about a longitudinal axis extending therethrough in a first direction, and each of said locking members being movable simultaneously into locked engagement with its associated one of said slats by rotating said cross bar about said longitudinal axis in a second rotational direction opposite to said first direction.

2. The apparatus of claim 1, wherein said cross bar includes a cross bar supporting member fixedly secured to each one of said outer ends of said cross bar; and wherein each said cross bar supporting member includes a camming surface adapted to engage with said locking member of said bracket member to urge said locking member between said locked engagement and said unlocked positions.

3. The apparatus of claim 2, wherein said camming surface comprises a non-linear camming surface.

4. The apparatus of claim 1, further comprising a biasing member associated with each one of said locking members for urging each one of said locking members into a locked position relative to its associated said slat.

5. The apparatus of claim 1, further comprising an actuating member associated with at least one of said bracket members and being manually engageable by an operator to hold said cross bar stationary relative to said bracket member when said actuating member is not being engaged by said operator.

6. A vehicle article carrier apparatus for supporting articles above an outer body surface of a vehicle, said apparatus comprising:

a pair of slats adapted to be secured to said outer body surface;

a cross bar for supporting articles thereon above said outer body surface;

a pair of bracket members each associated with one of said slats;

said cross bar including a cross bar supporting portion at each opposite end of said cross bar, said cross bar supporting portion being operably associated with one of said bracket members so as to permit said bracket members to support said cross bar above said outer body vehicle surface while permitting rotational movement of said cross bar relative to each of said bracket members, each one of said cross bars supporting portions further including a camming surface; and each of said bracket members further including a locking member for securing its respective said bracket member to its associated said slat, each of said locking members being movable simultaneously into unlocked positions when said cross bar is rotated in a first direction about a longitudinal axis extending therethrough, and said locking members further being movable simultaneously into locked positions when said cross bar is rotated in a second rotational direction opposite to said first direction.

7. The apparatus of claim 6, further comprising an actuating member associated with at least one of said bracket members for preventing rotation of said cross bar relative to said bracket member unless said actuating member is manually engaged by an operator prior to rotating said cross bar.

8. The apparatus of claim 6, further comprising a biasing member associated with each of said bracket members and operable to secure its associated said locking member in said locked position.

9. A vehicle article carrier apparatus for supporting articles above an outer body surface of a vehicle, wherein said outer body surface includes a pair of elongated slats secured to said outer body surface, said apparatus comprising:

a pair of bracket members adapted to move slidably along said slats, each said bracket member including a locking member adapted to be moved between locked and unlocked positions relative to its associated said slat;

a cross bar for supporting articles above said outer body surface, said cross bar including a cross bar supporting portion at each end thereof, each one of said cross bar supporting portions being rotatably coupled to said bracket member and having a camming surface operably associated with a respective one of said locking members for urging said respective one of said locking members between said locked and said unlocked positions; and each of said locking members being urged into locked positions generally simultaneously when said cross bar is grasped and rotated in a first direction about a longitudinal axis extending therethrough, and each of said locking members being movable into said locked positions generally simultaneously when said cross bar is grasped and rotated about said longitudinal axis in a second direction opposite to said first direction.

10. The apparatus of claim 9, wherein at least one of said bracket members includes a manually engageable actuating member operably associated with one of said cross bar supporting portions and one of said bracket members for preventing rotational movement of said cross bar relative to both of said bracket members unless said actuating member is manually engaged by an operator prior to rotating said cross bar.

11. The apparatus of claim 9, wherein each one of said bracket members includes a biasing member operably associated with a respective one of said locking members for urging its respective said locking member into said locked position.

12. The apparatus of claim 9, wherein said camming surface of each one of said cross bars supporting portions comprises a non-linear camming surface.

13. A vehicle article carrier apparatus for supporting articles above an outer body surface of a vehicle, said apparatus comprising:

a pair of slats adapted to be secured to said outer body surface, each of said slats including a channel;

a cross bar;

a pair of bracket members for supporting said cross bar above said outer body surface and adjustably positioning said cross bar along said slats, each of said bracket members including:

a housing;

a cross bar supporting member fixedly coupled to said cross bar and rotatable within said housing by grasping and rotating said cross bar about a longitudinal axis extending through said cross bar;

said cross bar supporting member further having a camming surface and a manually releasable actuating member for holding said cross bar supporting member stationary;

a locking member projecting into said channel of an associated one of said slats;

a biasing member operably associated with said locking member for urging said locking member into locking engagement with said associated slat; and said camming surface operating to allow said locking member to be urged by said biasing member into a locked position relative to said channel of said associated slat when said cross bar is grasped and rotated in a first direction, and to urge said locking member into an unlocked position against a biasing force provided by said biasing member when said cross bar is grasped and rotated in a second direction opposite to said first direction.

14. The apparatus of claim 13, wherein said biasing member comprises a curved length of spring steel.

15. The apparatus of claim 13, wherein said locking member comprises a clamping member having a base portion and a neck portion, said base portion residing within said channel of said associated slat and operating to engage interior surfaces of said slat; and said neck portion includes a notch for engaging with a portion of said biasing member to enable said biasing member to hold said clamping member in said locked position.

16. The apparatus of claim 13, wherein said cross bar supporting member comprises a cross bar securing portion and a main body portion;

said cross bar securing portion forming a sleeve engageable with an end portion of said cross bar; and wherein said main body portion includes an opening in communication with a cavity in said housing, said cavity enabling said actuating member to reside therein and to protrude through said opening and cooperate with said housing to maintain said cross bar securing portion stationary relative to said housing when said actuating member is not being manually engaged.

17. The apparatus of claim 16, wherein said actuating member comprises a locking spring having an actuating button, said actuating button protruding through said opening and into engagement with a portion of said housing when said actuating button is not being manually engaged.

18. The apparatus of claim 17, wherein said housing includes an opening through which said actuating button protrudes.

19. A vehicle article carrier apparatus for supporting articles above an outer body surface of a vehicle, said apparatus comprising:

a pair of slats adapted to be secured to said outer body surface, each of said slats including a channel;

a cross bar;

a pair of bracket members securable to opposite end portions of said cross bar for supporting said cross bar above said outer body surface and adjustably positioning said cross bar along said slats, each of said bracket member including:

a housing having an opening and a cavity;

a cross bar supporting member fixedly secured to said cross bar and rotatable within said housing by grasping and rotating said cross bar about a longitudinal axis extending through said cross bar;

said cross bar supporting member further having a non-linear camming surface;

an actuating member operably associated with said cross bar supporting member and with said housing for holding said cross bar supporting member fixedly relative to said housing when said actuating member is not being engaged by an operator of said apparatus;

a locking member projecting outwardly of said housing into said channel of an associated one of said slats;

a biasing member disposed within said housing and operably associated with said locking member for urging said locking member into locking engagement with said associated slat; and said non-linear camming surface operating to allow said locking member to be urged by said biasing member into a locked position relative to said channel of said associated slat when said cross bar is grasped and rotated in a first direction, and to urge said locking member into an unlocked position against a biasing force provided by said biasing member when said cross bar is grasped and rotated in a second direction opposite to said first direction.

20. The apparatus of claim 19, wherein said actuating member comprises a locking spring having an actuating button, said actuating button protruding through said opening in said housing and preventing rotational movement of said cross bar supporting member when said actuating button is not being depressed by said operator.

21. The apparatus of claim 19, wherein said biasing member comprises a curved length of spring steel.

22. The apparatus of claim 19, wherein said locking member comprises a base portion adapted to engage with at least one interior surface of said slat within said channel of said associated slat, and a neck portion operable to engage with a portion of said biasing member such that said biasing member is able to hold said locking member in said locked position when said actuating member is not being engaged by said operator.

23. The apparatus of claim 19, wherein said cross bar supporting member comprises:

a cross bar securing portion adapted to be fixedly secured to one of said end portions of said cross bar; and a main body portion integrally formed with said cross bar securing portion, said main body portion including said non-linear camming surface, a cavity for housing a portion of said actuating member, and an opening in communication with said cavity for enabling a portion of said actuating member to protrude therethrough.

24. The apparatus of claim 23, wherein said opening in said main body portion of said cross bar supporting member aligns with said opening in said housing when said cross bar is positioned in said locked position, such that said portion of said actuating member protrudes through both of said openings to prevent rotation of said cross bar relative to said housing.

25. A vehicle article carrier apparatus for supporting articles above an outer body surface of a vehicle, said apparatus comprising:

a pair of slats adapted to be secured to said outer body surface;

a cross bar for supporting articles thereon;

a pair of bracket members disposed at each end of said cross bar for supporting said cross bar above said outer body surface and adjustably positioning said cross bar along said slats, each of said bracket members including:

a housing;

a camming member disposed within said housing and fixedly secured to one of said ends of said cross bar, said camming member being rotatable in said housing by grasping said cross bar and rotating said cross bar about a longitudinal axis extending through said cross bar, and said camming member having a camming surface;

a locking member operably associated with said camming member and a biasing member operably associated with said locking member;

said camming surface of said camming member operating to urge said locking member into an unlocked position relative to an associated one of said slats when said cross bar is rotated in a first direction and to allow said biasing member to urge said locking member into a locked position when said cross bar is rotated in a second direction opposite to said first direction.

26. The apparatus of claim 25, wherein said biasing member comprises a length of curved, spring steel.

27. The apparatus of claim 26, wherein said locking member comprises a base portion and a neck portion, said base portion engaging with a portion of said slat to secure said bracket member to said slat when said bracket member is in said locked position; and said neck portion including a portion for engaging with said curved length of spring steel to permit said curved length of spring steel to urge said locking member into said locked position relative to said associated slat.

28. The apparatus of claim 25, wherein said camming surface comprises a non-linear surface formed so as to face said slat upon which said bracket member is disposed.

29. The apparatus of claim 25, wherein said camming member is coupled to said housing in a manner to allow rotational movement of said camming member relative to said housing while preventing said camming member from being removed from said housing.

* * * * *